United States Patent
Imai

(10) Patent No.: US 9,350,882 B2
(45) Date of Patent: May 24, 2016

(54) IMAGE PROCESSING SYSTEM, IMAGE PROCESSING APPARATUS, INFORMATION PROCESSING METHOD, AND STORAGE MEDIUM TO PREVENT ACCIDENTAL REMOVAL OF PRINT PRODUCTS

(71) Applicant: CANON KABUSHIKI KAISHA, Tokyo (JP)

(72) Inventor: Hitoshi Imai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/633,045

(22) Filed: Feb. 26, 2015

(65) Prior Publication Data

US 2015/0249752 A1   Sep. 3, 2015

(30) Foreign Application Priority Data

Mar. 3, 2014 (JP) ................ 2014-040841

(51) Int. Cl.
*H04N 1/00* (2006.01)
*G06T 7/20* (2006.01)
*H04N 7/18* (2006.01)
*H04N 101/00* (2006.01)

(52) U.S. Cl.
CPC ....... *H04N 1/00042* (2013.01); *H04N 1/00015* (2013.01); *H04N 1/00074* (2013.01); *H04N 1/00251* (2013.01); *H04N 7/183* (2013.01); *H04N 2101/00* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,493,601 B2* | 7/2013 | Hull et al. | G06F 17/30876 235/385 |
| 2012/0033253 A1* | 2/2012 | Mori | G06F 3/1263 358/1.15 |

FOREIGN PATENT DOCUMENTS

JP   2008-197152 A   8/2008

* cited by examiner

*Primary Examiner* — Thomas D Lee
(74) *Attorney, Agent, or Firm* — Canon USA, Inc. IP Division

(57) ABSTRACT

The present invention is directed to a technique for preventing accidental removal of a print product, including the case of one portion of the print product being pulled out, without keeping a user waiting for print output. An image processing system includes an output unit configured to output, to a monitoring tray, an output result of a print job to which a monitoring attribute is allocated, an imaging unit configured to capture a video of the monitoring tray, a detection unit configured to detect motion in an output product region of the monitoring tray, based on the video captured by the imaging unit, and a warning information output unit configured to output warning information in a case where the detection unit detects motion in the output product region.

18 Claims, 17 Drawing Sheets

A3 PORTRAIT

A4 LANDSCAPE

A4 PORTRAIT

A3 PORTRAIT

A4 LANDSCAPE

A4 PORTRAIT

FIG. 6

| MONITORING TRAY | SHEET SIZE | SHEET ORIENTATION | SHEET REGION |
|---|---|---|---|
| FIRST DISCHARGE TRAY | A3 | PORTRAIT | {1101011…} |
| FIRST DISCHARGE TRAY | A4 | LANDSCAPE | {0010111…} |
| FIRST DISCHARGE TRAY | A4 | PORTRAIT | {0110101…} |

A3 PORTRAIT

A4 LANDSCAPE

A4 PORTRAIT

FIG. 8

```
CALIBRATION EXECUTION SCREEN

MONITORING TRAY    [ FIRST DISCHARGE TRAY ▼ ]

SHEET SIZE         [ A4                    ▼ ]

SHEET ORIENTATION  [ PORTRAIT              ▼ ]

[ CANCEL ]                         [ EXECUTE ]
```

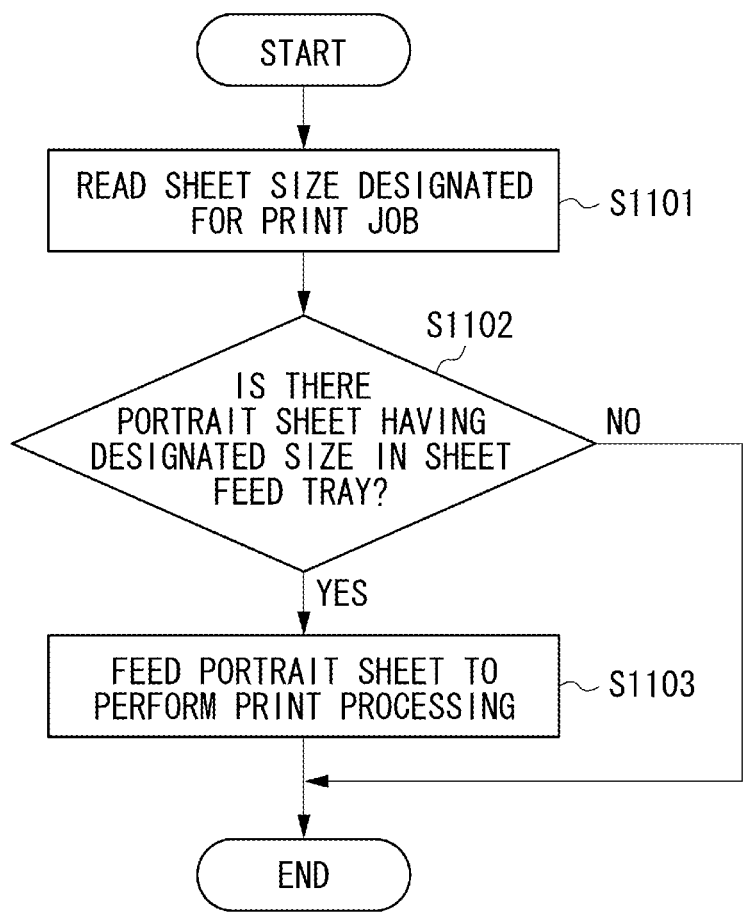

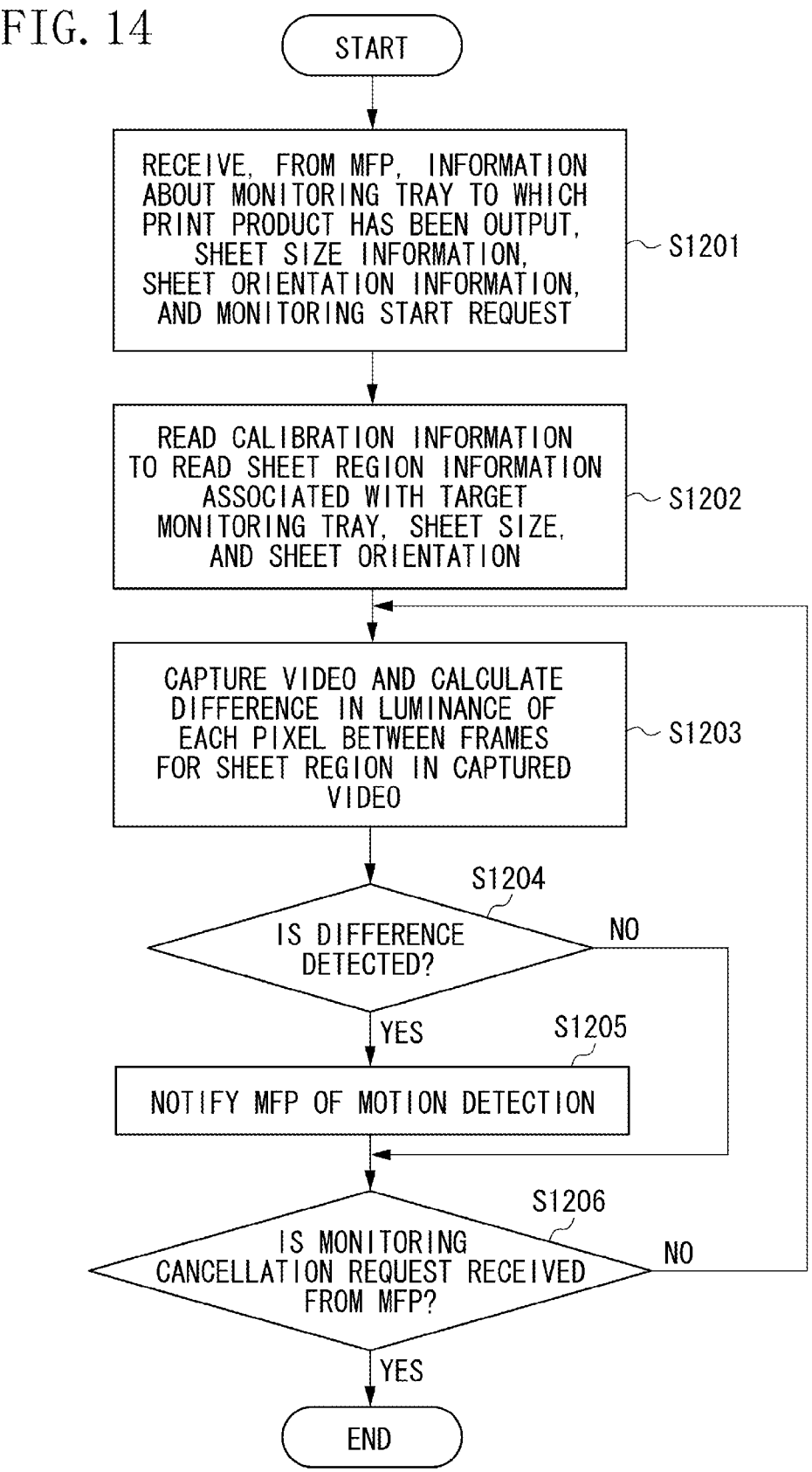

IMAGE PROCESSING SYSTEM, IMAGE PROCESSING APPARATUS, INFORMATION PROCESSING METHOD, AND STORAGE MEDIUM TO PREVENT ACCIDENTAL REMOVAL OF PRINT PRODUCTS

BACKGROUND OF THE INVENTION

1. Field of the Invention

The present invention relates to an image processing system, an image processing apparatus, an information processing method, and a storage medium.

2. Description of the Related Art

Multifunction peripherals (MFPs) capable of executing a wide variety of jobs are used in office environments. For example, the MFP can execute a copy job and a network print job. In the office environment, a person or persons often issue print instructions from their desks placed away from the MFP. In such a case, after the person issues the print instruction, an output product remains on a discharge tray of the MFP until the person goes and collects the output product from the MFP. Since the MFP is often used under an environment where many people exist, there has been such an issue that an output product is accidentally removed by the wrong person.

As a method for solving such an issue, there is a method called a secure print function. According to the secure print function, when a person inputs a print job from a personal computer (PC), the print job is once held in the MFP until the person issues a print execution instruction on an operation panel of the MFP. When the print execution instruction is issued, the MFP executes a print operation. With this function, the MFP starts printing a document when the person is present in front of the MFP. This enables an output product to be always within the sight of the person, thereby reliably preventing the output product from being accidentally removed by the wrong person.

Recently, with growing interest in security, network cameras have been installed in many locations for monitoring purposes. Some network cameras are connected to a network, so that captured videos are stored in a recording apparatus on the network. There has been discussed a method for solving the above issue by combining such a network camera with an MFP. Japanese Patent Application Laid-Open No. 2008-197152 discusses a technique in which a network camera starts capturing a video of an area near an MFP when a person inputs a print job, and stops capturing the video when the MFP detects removal of an output product from a discharge tray. When the person notices that his or her output product is missing, the person can review the video captured by the network camera to find a person who has removed the document.

The secure print function can prevent an output product from being accidentally removed by the wrong person. However, the use of such a function keeps a user waiting from the issue of a print execution instruction on the operation panel of the MFP until the completion of the printing. Particularly, when a plurality of pages is to be printed, the user needs to wait for a longer time.

Moreover, according to the method discussed in Japanese Patent Application Laid-Open No. 2008-197152, even though the output product can be taken back later, there is a possibility that an output product may be temporarily removed by a third party. In addition, removal of a sheet from the discharge tray of the MFP is generally detected by a simple detection method. For example, the detection method simply determines whether there is a sheet that is in contact with an upper surface of the discharge tray. Thus, even if a middle page is pulled out from a plurality of output products, the MFP cannot detect the fact. Consequently, even if a person peeks at one portion of the documents by removing and returning it, a print job owner may not notice such an incident unless the owner reviews the video.

SUMMARY OF THE INVENTION

The present invention is directed to a technique for preventing accidental removal of a print product, including the case of one portion of the print product being pulled out, without keeping a user waiting for print output.

According to an aspect of the present invention, an image processing system includes an output unit configured to output, to a monitoring tray, a print product based on a print job to which a monitoring attribute is allocated, an imaging unit configured to capture a video of the monitoring tray, a detection unit configured to detect motion in a print product region of the monitoring tray, based on the video captured by the imaging unit, and a warning information output unit configured to output warning information in a case where the detection unit detects motion in the print product region.

Further features of the present invention will become apparent from the following description of exemplary embodiments with reference to the attached drawings.

BRIEF DESCRIPTION OF THE DRAWINGS

FIG. 6 is a diagram illustrating an example of calibration information.

FIG. 8 is a diagram illustrating an example of a calibration execution screen to be displayed on a display touch panel of the MFP.

FIG. 13 is a flowchart illustrating an example of monitoring job print processing performed by the MFP.

FIG. 14 is a flowchart illustrating an example of monitoring processing performed by the network camera.

DESCRIPTION OF THE EMBODIMENTS

Hereinafter, exemplary embodiments of the present invention will be described with reference to drawings.

Figure 1:
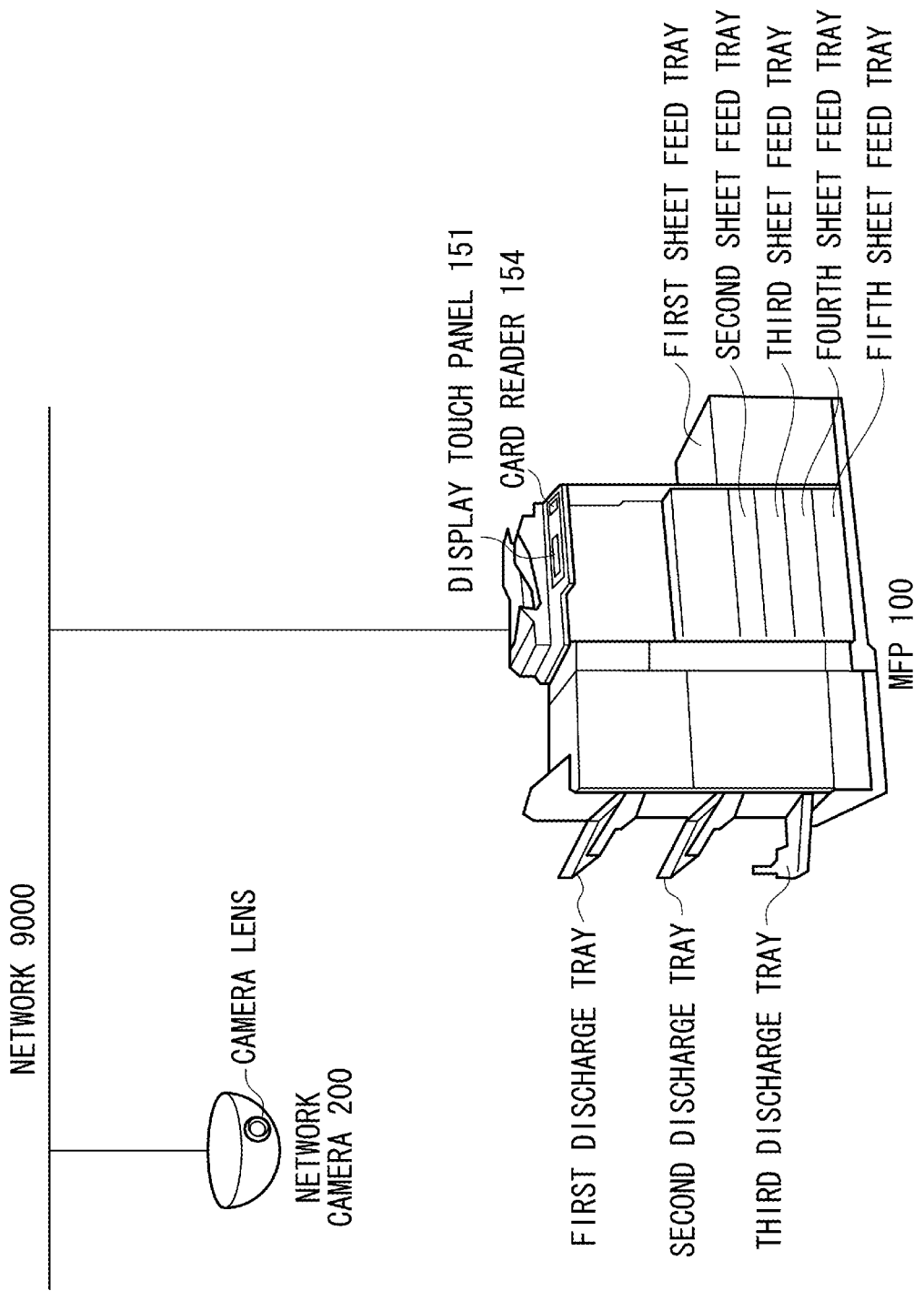
FIG. 1 is diagram illustrating an example of a system configuration of an image processing system.

FIG. 1 is diagram illustrating an example of a system configuration of an image processing system.

In the image processing system, a network camera 200 and an MFP 100 are connected via a network 9000 so that communication can be performed therebetween.

The MFP 100 includes five sheet feed trays and three discharge trays. Moreover, the MFP 100 includes a card reader 154 and a display touch panel 151 on the front surface thereof. A person brings a card close to the card reader 154 so that card authentication is performed. The display touch panel 151 displays information to the person, and accepts operation input from the person.

The network camera 200 includes a camera lens to capture videos of surrounding areas. The network camera 200 is generally installed for monitoring purpose. Therefore, the network camera 200 is often installed at high positions such as a ceiling so that a blind angle is not generated by an obstacle.

Figure 2:
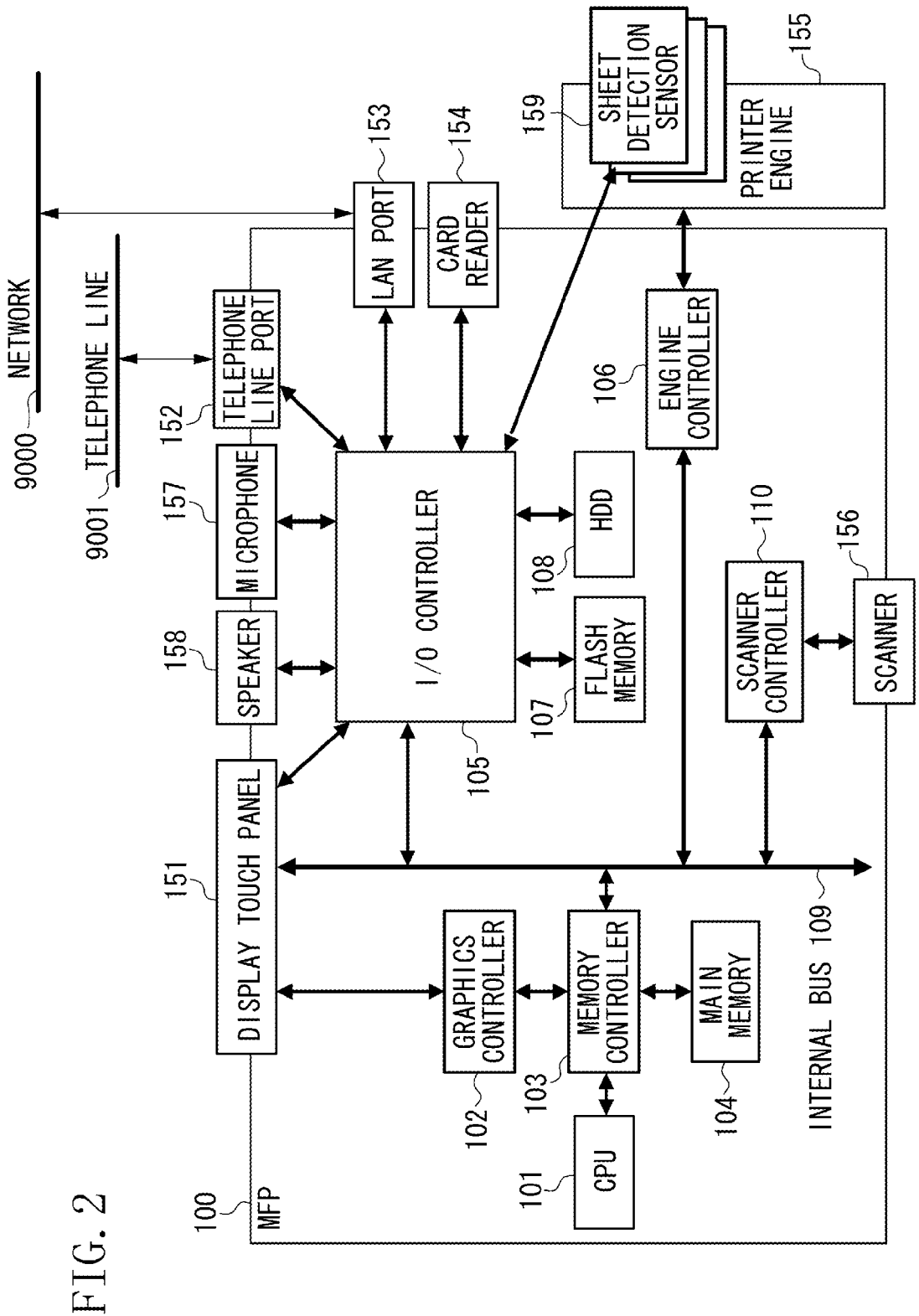
FIG. 2 is a diagram illustrating an example of a hardware configuration of an MFP.

FIG. 2 is a diagram illustrating an example of a hardware configuration of the MFP 100.

An internal bus 109 conveys electric signals so that information can be transferred between a memory controller 103, an input output (I/O) controller 105, an engine controller 106, and a scanner controller 110.

The memory controller 103 comprehensively controls access to a main memory 104.

The I/O controller 105 exchanges information with a flash memory 107, a hard disk drive (HDD) 108, a telephone line port 152, a local area network (LAN) port 153, the card reader 154, a microphone 157, a speaker 158, a touch panel of the display touch panel 151, and processing units connected via the internal bus 109.

The telephone line port 152 exchanges information with the I/O controller 105 and other devices connected via a telephone line 9001.

The LAN port 153 exchanges information with the I/O controller 105 and other devices such as the network camera 200 connected via the network 9000.

The card reader 154 exchanges information with the I/O controller 105 and an identification (ID) card that is brought within a communication range.

A sheet detection sensor 159 is disposed in each of the discharge trays of the MFP 100 to detect whether there is a sheet on the corresponding discharge tray. Each of the sheet detection sensors 159 exchanges information about sheet detection with the I/O controller 105.

The sheet on the discharge tray is an example of an output result of a print job.

The engine controller 106 exchanges information with a printer engine 155 and processing units connected via the internal bus 109.

The scanner controller 110 exchanges information with a scanner 156 and the processing units connected via the internal bus 109.

The flash memory 107 stores a boot loader program.

The HDD 108 stores an MFP control program.

The main memory 104 is a volatile memory. Since the main memory 104 is accessible at high speed, information stored in the flash memory 107 or the HDD 108 and information to be temporarily used are stored in the main memory 104.

When the MFP 100 is turned on, a central processing unit (CPU) 101 reads and executes the boot loader program, and retrieves the MFP control program stored in the HDD 108 to store the program in the main memory 104. Then, when the CPU 101 executes the MFP control program stored in the main memory 104, each of functions of the MFP 100 is realized. Moreover, the execution of the MFP control program by the CPU 101 enables the MFP 100 to execute processing of flowcharts illustrated in FIGS. 9, 12, 13, 15, and 16.

Each of such functions will be specifically described using the MFP 100 as an example.

The printer engine 155 includes a function of printing an image. More specifically, the CPU 101 performs image processing to generate an image, and the printer engine 155 develops the image on a sheet with a coating material, thereby printing the image.

The scanner 156 includes a function of optically capturing an image of a paper document. The CPU 101 may perform image processing upon receipt of information about the captured image, and then the printer engine 155 may execute print processing of the sheet document. Such an operation serves as a copy function. On the other hand, the MFP 100 may receive a document from another device via the network 9000 or the LAN port 153, and then the CPU 101 may perform document interpretation processing and image processing on the received document. In such a case, if the printer engine 155 prints the resultant data on a sheet, such an operation serves as a page description language (PDL) print function.

The MFP 100 includes the display touch panel 151 in which a display for displaying information and a touch panel for accepting information input from a user are integrally formed.

A graphics controller 102 controls display on the display of the display touch panel 151. The MFP 100 displays a screen for prompting the user to input information, on the display touch panel 151 as necessary. The user then performs a touch operation on the display touch panel 151 to input an instruction to the MFP 100. Moreover, the MFP 100 has another method for receiving an instruction from the user.

The MFP 100 includes the microphone 157. The microphone 157 picks up the sound of words when the user issues a verbal instruction. The CPU 101 performs sound recognition processing and instruction extraction processing, so that the MFP 100 comprehends the instruction from the user.

Moreover, the MFP 100 includes the speaker 158. The CPU 101 converts notification information to be transmitted to the user into sound information to playback the sound via the speaker 158. Thus, the MFP 100 can notify the user of the information as sound.

Figure 3:
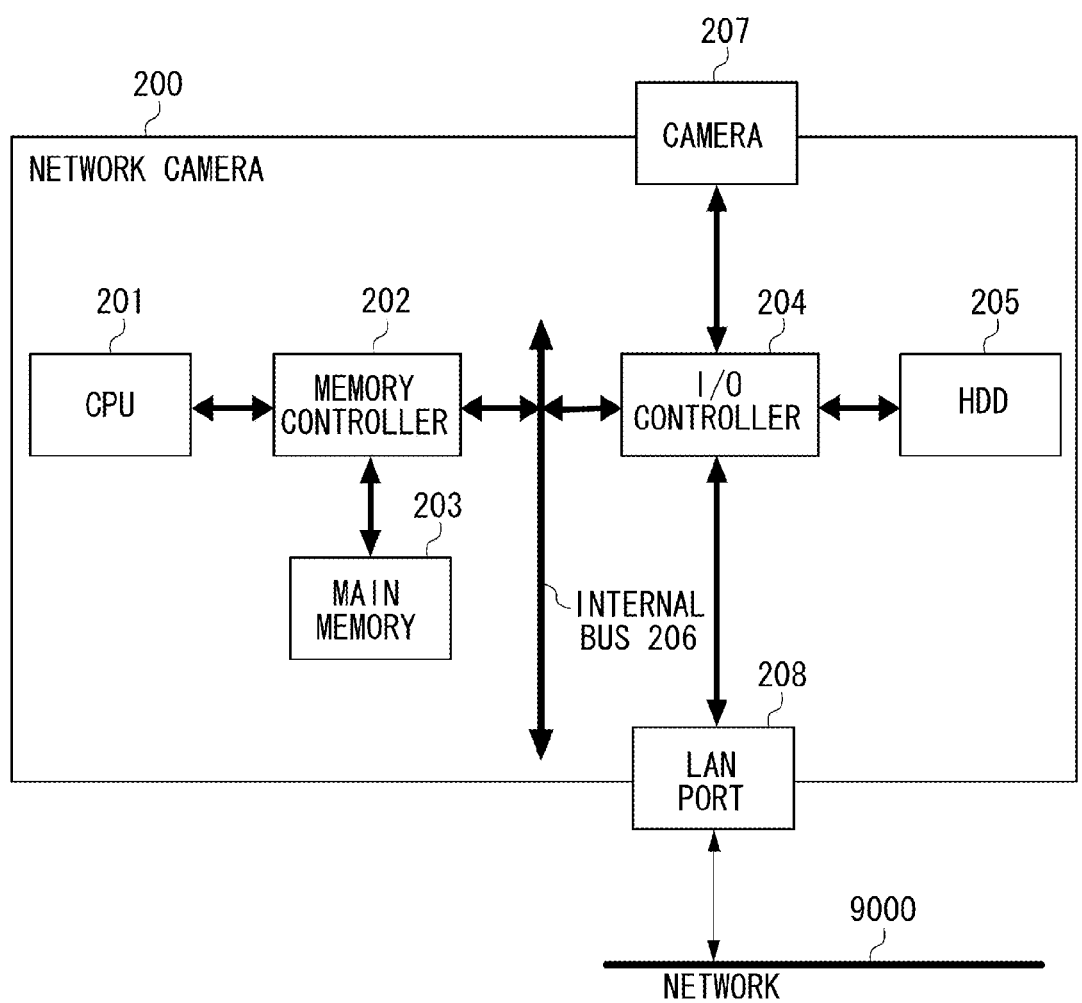
FIG. 3 is a diagram illustrating an example of a hardware configuration of a network camera.

FIG. 3 is a diagram illustrating an example of a hardware configuration of the network camera 200.

The network camera 200 according to a first exemplary embodiment is configured to be attached to the ceiling, so that a video of a space within a building can be widely captured. In addition to the ceiling-attached type, the network camera 200 may be embedded in a wall. Moreover, the network camera 200 may be set on a stand.

An internal bus 206 transmits and receives electric signals so that information can be transferred between a memory controller 202 and an I/O controller 204.

The memory controller 202 comprehensively controls access to a main memory 203. The I/O controller 204 transmits and receives information to and from an HDD 205, a LAN port 208, a camera 207 and processing units connected via the internal bus 206.

The LAN port 208 transmits and receives information to and from the I/O controller 204 and other devices such as the MFP 100 connected via the network 9000.

The HDD 205 stores a boot loader program and a control program of the network camera 200.

The main memory 203 is a volatile memory. Since the main memory 203 is accessible at high speed, information stored in the HDD 205 and information to be temporarily used are stored in the main memory 203.

When the network camera 200 is turned on, a CPU 201 reads and executes the boot loader program, and retrieves the control program stored in the HDD 205 to store the control program in the main memory 203. Then, when the CPU 201 executes the control program stored in the main memory 203, each function of the network camera 200 is realized. Moreover, the execution of such a control program by the CPU 201 enables the network camera 200 to execute processing of flowcharts illustrated in FIGS. 10, 11, and 14.

FIGS. 4A, 4B, 4C, and 4D are diagrams illustrating examples of videos captured by the network camera 200. In FIGS. 4A through 4D, only main points are illustrated with lines for the sake of explanation of the present exemplary embodiment. In practice, the video captured by the network camera 200 is formed by a plurality of pixels.

Figure 4A:
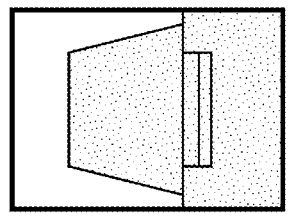
FIGS. 4A to 4D are diagrams illustrating examples of videos captured by the network camera.
Figure 4B:
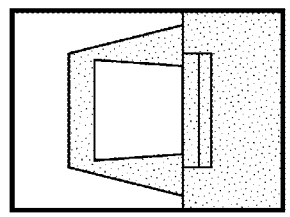
Figure 4C:
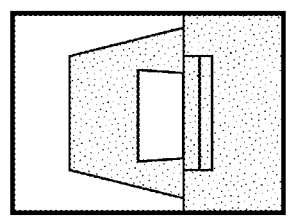
Figure 4D:
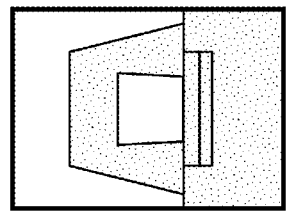

FIG. 4A illustrates a video captured when there is no sheet on a monitoring tray of the MFP 100. FIG. 4B illustrates a video captured when there is an A3 size sheet in a portrait orientation (a direction in which short sides of the sheet are output as a leading edge and a trailing edge) on the monitoring tray of the MFP 100. FIG. 4C illustrates a video captured when there is an A4 size sheet in a landscape orientation (a direction in which long sides of the sheet are output as a leading edge and a trailing edge) on the monitoring tray of the MFP 100. FIG. 4D illustrates a video captured when there is an A4 size sheet in a portrait orientation on the monitoring tray of the MFP 100.

Figure 5A:
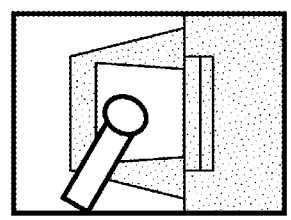
FIGS. 5A to 5C are diagrams illustrating other examples of videos captured by the network camera.
Figure 5B:
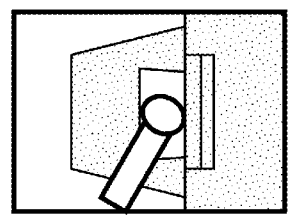
Figure 5C:
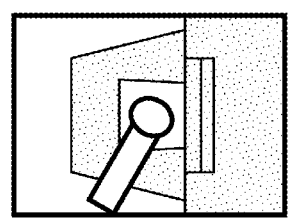

FIGS. 5A, 5B, and 5C are diagrams illustrating other examples of videos captured by the network camera 200. In FIGS. 5A through 5C, only main points are illustrated with lines for the sake of explanation of the present exemplary embodiment. In practice, the video captured by the network camera 200 is formed by a plurality of pixels.

FIG. 5A illustrates a video captured when there is an A3 size sheet in a portrait orientation on the monitoring tray of the MFP 100 with a hand of a person placed on the sheet. FIG. 5B illustrates a video captured when there is an A4 size sheet in a landscape orientation on the monitoring tray of the MFP 100 with a hand of a person placed on the sheet. FIG. 5C illustrates a video captured when there is an A4 size sheet in a portrait orientation on the monitoring tray of the MFP 100 with a hand of a person placed on the sheet.

FIG. 6 is a diagram illustrating an example of calibration information.

The calibration information is stored in the HDD 205 of the network camera 200. The calibration information is managed in a table including information of the monitoring tray, a sheet size, a sheet orientation, and a sheet region as attributes. Based on the calibration information, the CPU 201 can read which discharge tray is to be used as a monitoring tray, and which size and orientation of a sheet is to be output on the monitoring tray. Moreover, the CPU 201 can read which region of the video captured by the network camera 200 corresponds to a sheet region. For example, data elements in the third row of the table illustrated in FIG. 6 indicate the following. If the first discharge tray is used as a monitoring tray and an A4 size sheet in a portrait orientation is output on the monitoring tray, a region indicated by a data string of {01101 . . . } in the video captured by the network camera 200 corresponds to a sheet region. The sheet region is an example of an output product region.

Figure 7A:
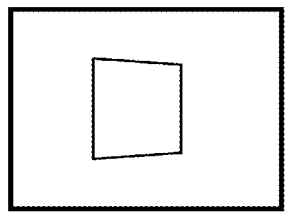
FIGS. 7A to 7C are diagrams illustrating examples of sheet regions of the calibration information.
Figure 7B:
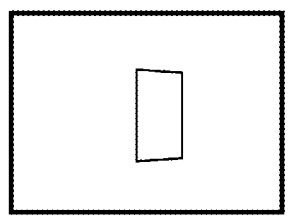
Figure 7C:
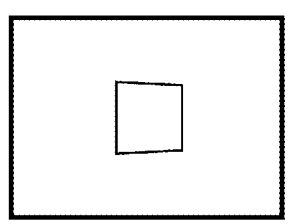

FIGS. 7A, 7B, and 7C are diagrams illustrating examples of sheet regions of the calibration information.

In each of FIGS. 7A through 7C, an outer frame represents a region of a video to be captured by the network camera 200. FIG. 7A illustrates a sheet region indicated by data elements in the first row of the table in FIG. 6. FIG. 7B illustrates a sheet region indicated by data elements in the second row of the table in FIG. 6, whereas FIG. 7C illustrates a sheet region indicated by the data elements in the third row of the table illustrated in FIG. 6.

First, a calibration operation will be described. The calibration operation is performed for defining, in the network camera 200, which region of the video to be captured by the network camera 200 a sheet region on the monitoring tray of the MFP 100 corresponds to. This calibration operation is performed for enhancing accuracy of a monitoring operation of the image processing system, which will be described below. By the calibration, the sheet region on the monitoring tray that is to be watched is clearly defined in the network camera 200. This enables the network camera 200 to reliably monitor only the sheet region on the monitoring tray. As a result, malfunction such as the following can be prevented. If the network camera 200 detects an object that is present on the monitoring tray but absent on the sheet region, the MFP 100 erroneously issues a warning. More specifically, for example, the MFP 100 may issue a warning even in a case where a person merely places his/her hand on an edge of the monitoring tray without touching a print product.

FIG. 8 is a diagram illustrating an example of a calibration execution screen to be displayed on the display touch panel 151 of the MFP 100.

When the MFP 100 and the network camera 200 are set up, the user operates the MFP 100 to display the calibration execution screen, on which the user issues a calibration execution instruction.

On the calibration execution screen, for example, menus and buttons for execution and cancellation of the calibration are displayed. The menus are used for setting a discharge tray to be used as a monitoring tray, a size of a sheet to be output to the monitoring tray, and a sheet orientation.

Herein, a video as illustrated in FIG. 4A is captured by the network camera 200 as a video prior to the calibration.

Next, the user sets, for example, the first discharge tray as a monitoring tray, A4 as a sheet size, and a portrait orientation as a sheet orientation. Then, the user presses an execution button. Accordingly, the MFP 100 feeds an A4 size sheet in a portrait orientation from a sheet feed tray to output the sheet to the first discharge tray. Herein, a video as illustrated in FIG. 4D is captured by the network camera 200.

The network camera 200 calculates a difference in luminance of each pixel between this video and the video captured prior to the calibration to determine a sheet region. Herein, the network camera 200 determines a sheet region applied when the A4 size sheet in the portrait orientation is output on the first discharge tray, so that the sheet region as illustrated in FIG. 7C can be obtained. The network camera 200 associates information of the obtained sheet region with the monitoring tray information, the sheet size information, and the sheet orientation information, and stores the resultant information in the HDD 205 as the calibration information.

Figure 9:
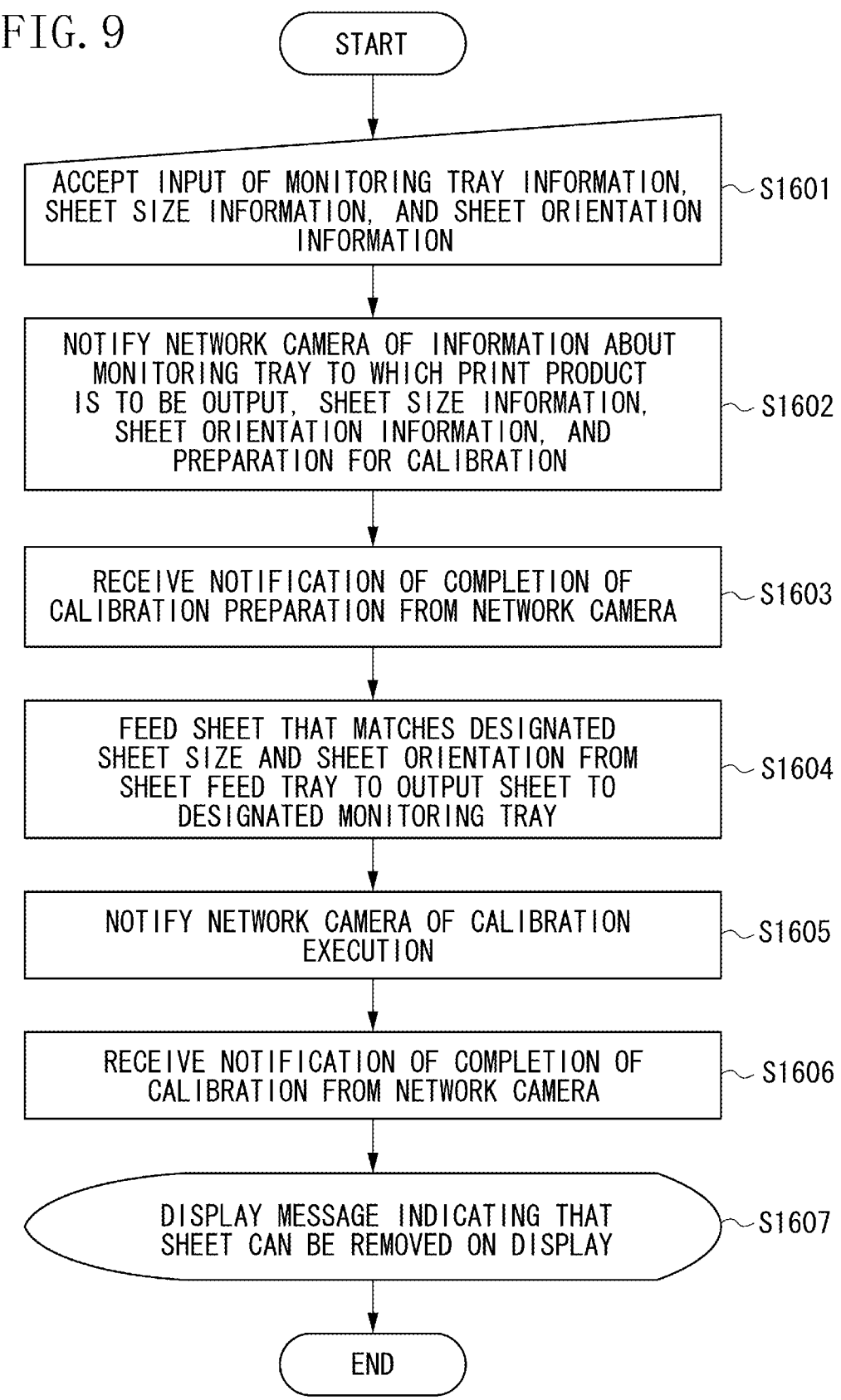
FIG. 9 is a flowchart illustrating an example of calibration processing performed by the MFP.

FIG. 9 is a flowchart illustrating an example of calibration processing performed by the MFP 100. Each of steps S1601 through S1607 illustrated in FIG. 9 is executed by the MFP 100.

In step S1601, the CPU 101 displays the calibration execution screen illustrated in FIG. 8 on the display touch panel 151, and accepts input of monitoring tray information, sheet size information, and sheet orientation information from the user.

In step S1602, the CPU 101 notifies the network camera 200 of the information about the monitoring tray to which a print product is to be output, the sheet size information, and the sheet orientation information, together with preparation for calibration. In step S1601, for example, if the user sets the monitoring tray, the sheet size, and the sheet orientation as illustrated in FIG. 8, then in step S1602, the MFP 100 notifies the network camera 200 of the first discharge tray as the monitoring tray, A4 size as the sheet size, and a portrait orientation as the sheet orientation. The network camera 200 receives this notification in step S1701 of a flowchart illustrated in FIG. 10 to be described below.

In step S1603, the CPU 101 receives notification of completion of the calibration preparation from the network camera 200.

In step S1604, the CPU 101 feeds a sheet that matches the designated sheet size and sheet orientation from a sheet feed tray to output the sheet to the designated monitoring tray. For example, an A4 size sheet in a portrait orientation is fed from a sheet feed tray, and then output to the first discharge tray serving as the monitoring tray.

In step S1605, the CPU 101 notifies the network camera 200 of calibration execution. The network camera 200 receives this notification in step S1801 of a flowchart illustrated in FIG. 11 to be described below.

In step S1606, the CPU 101 receives notification of completion of the calibration from the network camera 200.

In step S1607, the CPU 101 displays a message indicating that the sheet can be removed, on the display touch panel 151. Then, the processing illustrated in FIG. 9 ends.

Figure 10:
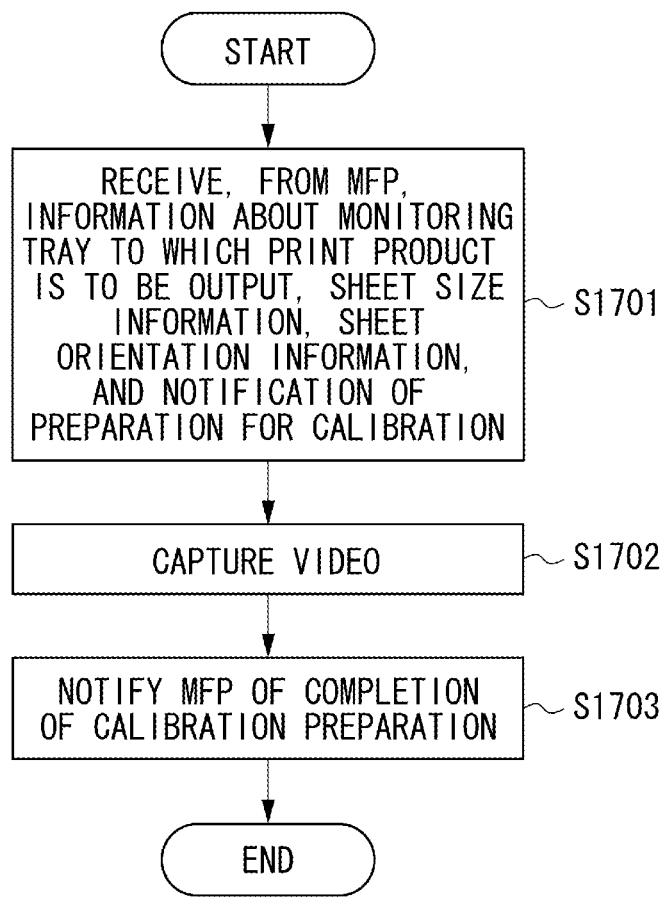
FIG. 10 is a flowchart illustrating an example of calibration preparation processing performed by the network camera.

FIG. 10 is a flowchart illustrating an example of calibration preparation processing performed by the network camera 200. Each of steps S1701 through S1703 illustrated in FIG. 10 is executed by the network camera 200.

In step S1701, the CPU 201 receives from the MFP 100 the information about the monitoring tray to which a print product is to be output, the sheet size information, and the sheet orientation information, together with the notification of preparation for calibration. For example, the network camera 200 is notified by the MFP 100 of the first discharge tray as a monitoring tray, A4 size as a sheet size, and a portrait orientation as a sheet orientation.

In step S1702, the CPU 201 controls the camera 207 to capture a video prior to execution of the calibration. For example, a video as illustrated in FIG. 4A is captured.

In step S1703, the CPU 201 notifies the MFP 100 of completion of the calibration preparation, and the processing illustrated in FIG. 10 ends. The MFP 100 receives this notification in step S1603 of the flowchart illustrated in FIG. 9.

Figure 11:
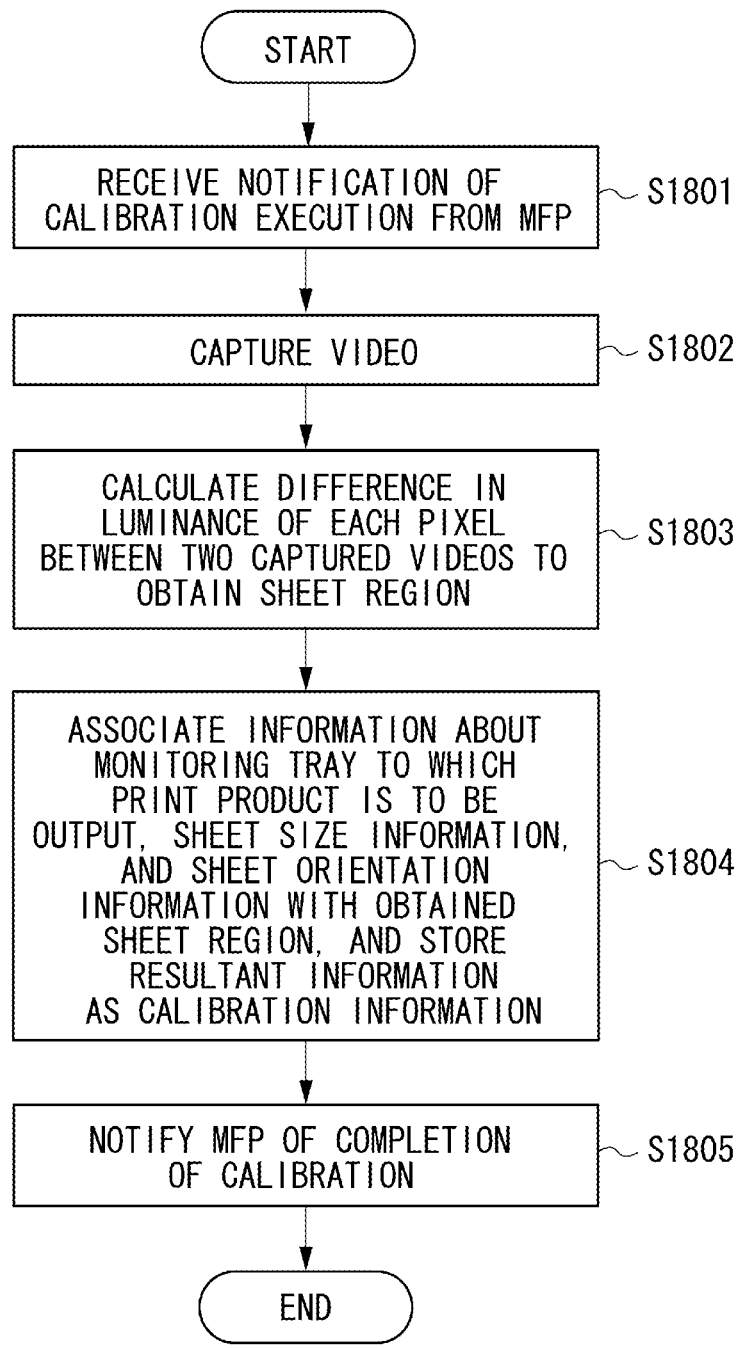
FIG. 11 is a flowchart illustrating an example of calibration processing performed by the network camera.

FIG. 11 is a flowchart illustrating an example of calibration processing performed by the network camera 200. Each of steps S1801 through S1805 illustrated in FIG. 11 is executed by the network camera 200.

In step S1801, the CPU 201 receives the notification of calibration execution from the MFP 100.

In step S1802, the CPU 201 controls the camera 207 to capture a video. For example, a video as illustrated in FIG. 4D is captured.

In step S1803, the CPU 201 calculates a difference in luminance of each pixel between the two captured videos, that is, the video captured in step S1702 illustrated in FIG. 10 and the video captured in step S1802, to obtain a sheet region. In the above example, the sheet region is obtained as illustrated in FIG. 7C.

In step S1804, the CPU 201 associates the information about the monitoring tray to which a print product is to be output, the sheet size information, the sheet orientation information with the obtained sheet region, and stores the resultant information as calibration information. In the above description, for example, the calibration information is stored as the data elements in the third row of the table illustrated in FIG. 6.

In step S1805, the CPU 201 notifies the MFP 100 of completion of the calibration, and the processing illustrated in FIG. 11 ends. The MFP 100 receives this notification in step S1606 of the flowchart illustrated in FIG. 9.

Next, a monitoring operation performed by the image processing system will be described. Through the monitoring operation, the network camera 200 monitors an output product printed out by the MFP 100 to prevent the output product from being accidentally removed.

Figure 12A:
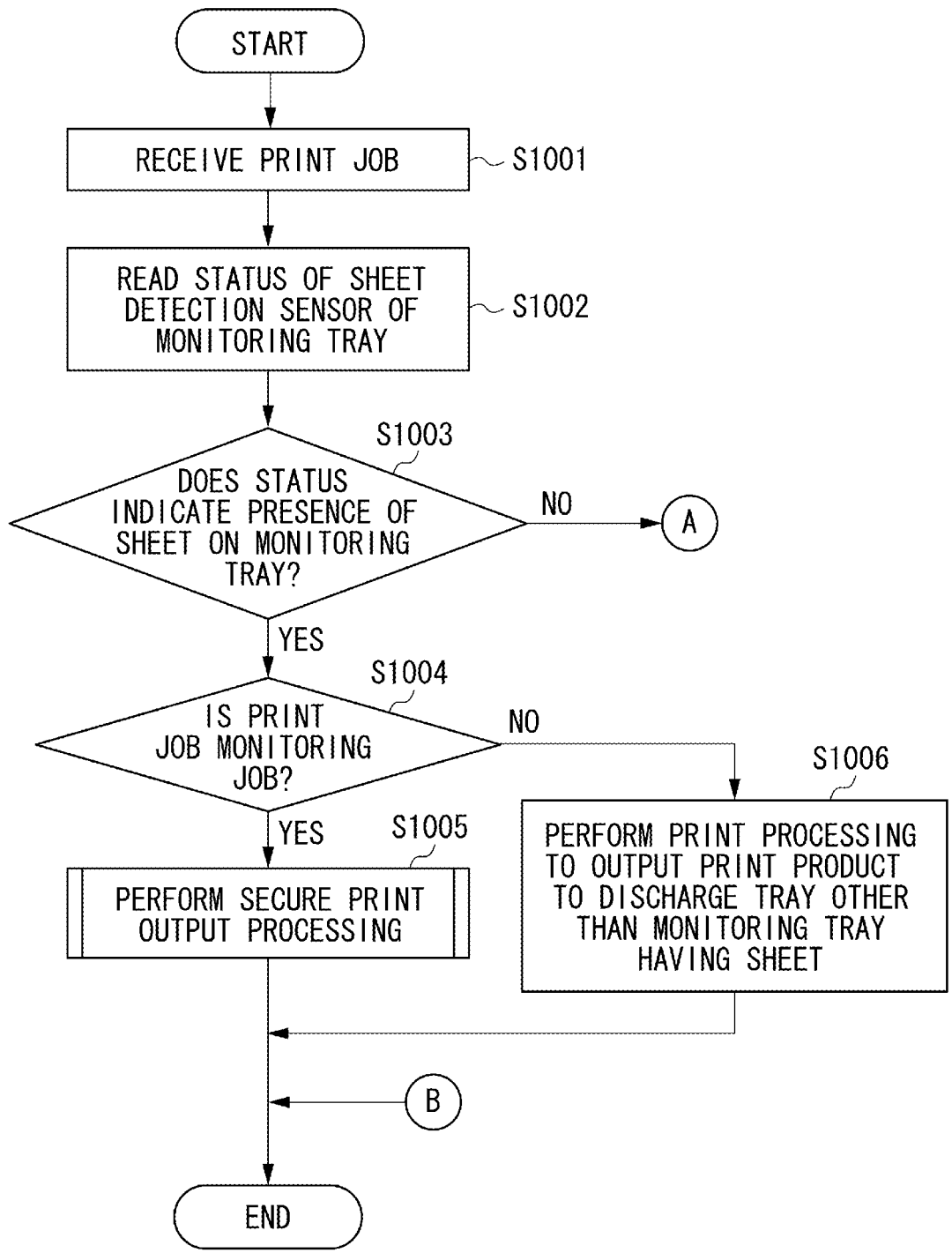
FIG. 12, which is composed of FIGS. 12A and 12B, is a flowchart illustrating an example of print job processing performed by the MFP.
Figure 12B:
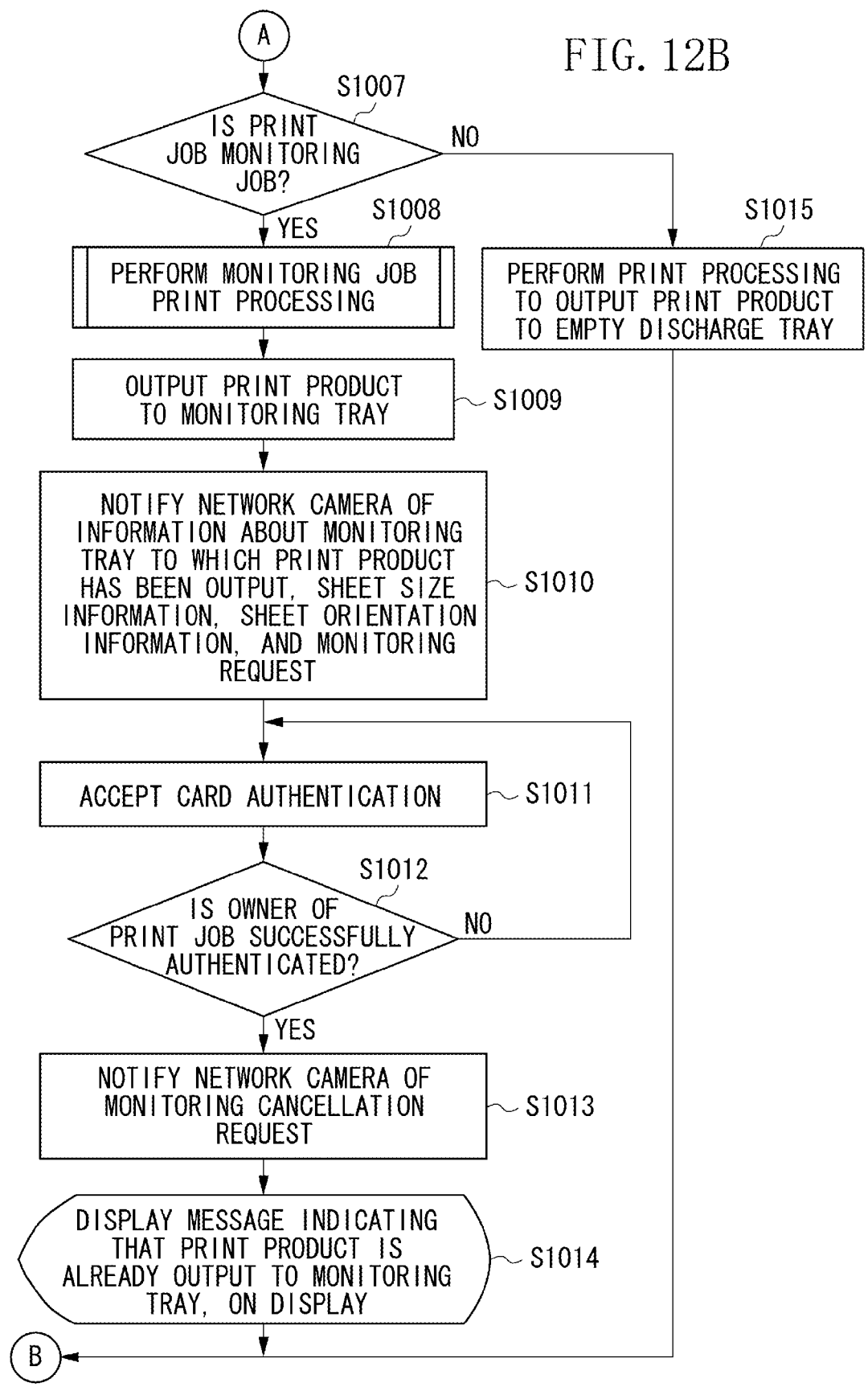

FIG. 12 is a flowchart illustrating an example of print job processing performed by the MFP 100. Each of steps S1001 through S1015 illustrated in FIG. 12 is executed by the MFP 100.

In step S1001, the CPU 101 receives a print job from an information processing apparatus such as a PC. The print job is called, for example, PDL data. The print job includes a control command for controlling the MFP 100, and a drawing command. Examples of the control command include the one indicating whether a type of the print job is a normal job or a monitoring job, and the one indicating whether a size of a sheet to be used in a print operation is an A3 size sheet or an A4 size sheet. Examples of the drawing command include the one indicating which color and shape of object is to be drawn in which coordinates. Upon receipt of the print job, the CPU 101 analyzes this print job to execute suitable sheet feeding processing, print processing, and discharge processing.

The print job including a control command indicating the monitoring job is an example of a print job to which a monitoring attribute is allocated.

In step S1002, the CPU 101 reads a status of the sheet detection sensor 159 of the monitoring tray.

In step S1003, the CPU 101 determines whether the status read in step S1002 indicates the presence of a sheet on the monitoring tray. If the CPU 101 determines that the status read in step S1002 indicates the presence of a sheet (YES in step S1003), the operation proceeds to step S1004. If, on the other hand, the CPU 101 determines that the status read in step S1002 indicates the absence of a sheet (NO in step S1003), the operation proceeds to step S1007. In step S1004, the CPU 101 reads a job type command in the control command of the received print job to determine whether the print job is a monitoring job. If the CPU 101 determines that the print job is a monitoring job (YES in step S1004), the operation proceeds to step S1005. If, on the other hand, the CPU 101 determines that the print job is a normal job (NO in step S1004), the operation proceeds to step S1006.

In a case where an output product of a previous print job is already placed on the monitoring tray, an output product of a next print job is stacked on the previous print job. This causes difficulty in distinguishing one from another. Thus, in step S1005, the CPU 101 performs hold print processing so as not to print out a print job until an owner of the print job is successfully authenticated, and to print out the print job when the owner of the print job is successfully authenticated. That is, in step S1005, the CPU 101 performs secure print output processing described below with reference to FIG. 16, and the processing illustrated in FIG. 12 ends.

In step S1006, the CPU 101 performs print processing of the normal job to output a print product to a discharge tray other than the monitoring tray having the sheet. Then, the processing illustrated in FIG. 12 ends.

In step S1007, the CPU 101 reads the job type command in the control command of the received print job to determine whether the print job is a monitoring job. If the CPU 101 determines that the received print job is a monitoring job (YES in step S1007), the operation proceeds to step S1008. If, on the other hand, the CPU 101 determines that the received print job is a normal job (NO in step S1007), the operation proceeds to step S1015.

In steps S1008 through S1009, since the monitoring tray is empty, the CPU 101 outputs a print product of the monitoring job to the monitoring tray. That is, in step S1008, the CPU 101 performs monitoring job print processing which will be described below with reference to FIG. 13.

In step S1009, the CPU 101 performs control to output a print product to the monitoring tray.

In steps S1010 through S1012, the CPU 101 cooperates with the network camera 200 to perform monitoring processing so that the print product output to the monitoring tray is not removed by the wrong person. That is, in step S1010, the CPU 101 notifies the network camera 200 of information about the monitoring tray to which the print product has been output, sheet size information, and sheet orientation information, together with a monitoring request (a monitoring start request) (i.e., the CPU 101 transmits these pieces of information and the monitoring start request to the network camera 200). The network camera 200 receives this notification in step S1201 of a flowchart illustrated in FIG. 14 to be described below. For example, the CPU 101 notifies the network camera 200 of the first discharge tray as the monitoring tray information, A4 as the sheet size information, and portrait as the sheet orientation information.

In step S1011, the CPU 101 accepts card authentication. The card authentication can be performed by the user bringing a card, on which an ID is recorded, close to the card reader 154. The CPU 101 reads the ID of the user via the card reader 154 or the like, to identify who is present in front of the MFP 100.

In step S1012, the CPU 101 determines whether the owner of the print job is authenticated, based on a result of the card authentication performed in step S1011. If the CPU 101 determines that the owner of the print job is authenticated (YES in step S1012), the operation proceeds to step S1013. On the other hand, if the CPU 101 determines that the person in front of the MFP 100 is not the owner of the print job (NO in step S1012), the operation returns to step S1011 to continue the monitoring processing.

In step S1013, since the CPU 101 has identified that the person in front of the MFP 100 is the owner of the monitoring job, based on the determination made in step S1012, the CPU 101 notifies the network camera 200 of a monitoring cancellation request so as to stop the monitoring processing. The network camera 200 receives this notification in step S1206 of the flowchart illustrated in FIG. 14.

In step S1014, the CPU 101 displays, on the display touch panel 151, a message indicating that a print product of the monitoring job is already output to the monitoring tray, so as to accordingly inform the monitoring job owner. Then, the processing illustrated in FIG. 12 ends.

In step S1015, the CPU 101 performs print processing of the normal job to output a print product to an empty discharge tray. Then, the processing illustrated in FIG. 12 ends. The empty discharge tray is an example of an output tray that is different from the monitoring tray.

FIG. 13 is a flowchart illustrating an example of the monitoring job print processing performed by the MFP 100. Each of steps S1101 through S1103 illustrated in FIG. 13 is executed by the MFP 100.

In step S1101, the CPU 101 reads a sheet size command in a control command of the received print job.

In step S1102, the CPU 101 determines whether there is a portrait sheet having the size read in step S1101 in a sheet feed tray. If the CPU 101 determines that there is a portrait sheet with the size designated for the print job in the sheet feed tray (YES in step S1102), the operation proceeds to step S1103. If, on the other hand, the CPU 101 determines that there is no portrait sheet with the size designated for the print job in the sheet feed tray (NO in step S1102), the processing illustrated in FIG. 13 ends.

In step S1103, the CPU 101 feeds the portrait sheet from the sheet feed tray to perform print processing. Then, the processing illustrated in FIG. 13 ends.

For example, assume that A4 size sheets in a portrait orientation are set in the first sheet feed tray of the MFP 100, whereas A4 size sheets in a landscape orientation are set in the second sheet feed tray. According to the processing described with reference to the flowchart illustrated in FIG. 13, if the sheet size read in step S1101 is A4 size, the CPU 101 feeds an A4 size sheet in a portrait orientation from the first sheet feed tray to perform print processing.

The network camera 200 is not always installed in an ideal location. The network camera 200 may be in the shade of the MFP 100, depending on a location in which the network camera 200 is installed. In such a case, there is a possibility that the network camera 200 captures a video of only one portion of the monitoring tray.

With the processing described in FIG. 13, for example, a sheet is output in a portrait orientation as illustrated in FIG. 4D. Accordingly, an area of a sheet region to be included in a video captured by the network camera 200 becomes larger than, for example, that of the sheet region of a case where a sheet is output in a landscape orientation as illustrated in FIG. 4C. This increases the degree of freedom for installation location of the network camera 200.

FIG. 14 is a flowchart illustrating an example of the monitoring processing performed by the network camera 200. Each of steps S1201 through S1206 illustrated in FIG. 14 is executed by the network camera 200.

In step S1201, the CPU 201 receives, from the MFP 100, the information about the monitoring tray to which the print product has been output, the sheet size information, and the sheet orientation information, together with the monitoring start request. For example, the CPU 201 receives the first discharge tray as the monitoring tray information, A4 as the sheet size information, and portrait as the sheet orientation information.

In step S1202, the CPU 201 reads calibration information from the HDD 205 to read sheet region information associated with target monitoring tray, sheet size, and sheet orientation. Thus, the CPU 201 identifies a sheet region. The calibration information refers to, for example, the ones listed in the table illustrated in FIG. 6. If the first discharge tray, A4 size, and portrait are respectively used as a monitoring tray, a sheet size, and a sheet orientation, a sheet region indicated by a data string of {01101 . . . } is identified. This sheet region is illustrated in FIG. 7C, which is an example of a sheet region of the video captured by the network camera 200.

In step S1203, the CPU 201 controls the camera 207 to capture a video, and calculates a difference in luminance of each pixel between frames of the captured video, for a sheet region in the captured video. The CPU 201 can calculate the luminance difference by using a general technique for determining a background difference. For example, the CPU 201 uses functions such as cvAbsDiff of an open source computer vision library (OpenCV). This cvAbsDiff function is defined as follows.

void cvAbsDiff (const CvArr*src1, constCvArr*src2, CvArr*dst),
where src1 is a first input array, src2 is a second input array, and dst is an output array. If certain frame video data, frame video data taking a difference, and an empty array are used as arguments in src1, src2, and dst, respectively, to call the cvAbsDiff function, difference data is stored in dst.

The sheet region in the captured video is, for example, a region illustrated in FIG. 7C. When the network camera 200 captures a video, in a case where frames as illustrated in FIG. 4D are continuously captured, there is no difference in luminance of each pixel between frames. In a case where the network camera 200 captures a frame as illustrated in FIG. 5C after capturing a frame as illustrated in FIG. 4D, a difference in luminance between frames is generated in pixels of a region having a hand of someone.

If the CPU 201 detects a difference as a result of the calculation performed in step S1203 (YES in step S1204), the operation proceeds to step S1205. If, on the other hand, the CPU 201 does not detect a difference (NO in step S1204), the operation proceeds to step S1206.

In step S1205, the CPU 201 notifies the MFP 100 of the motion detection in the sheet region of the monitoring tray. The MFP 100 receives this notification in step S1301 of a flowchart illustrated in FIG. 15 to be described below. In step S1206, the CPU 201 determines whether a monitoring cancellation request is received from the MFP 100. If the CPU 201 determines that the monitoring cancellation request is received (YES in step S1206), the processing illustrated in FIG. 14 ends. If, on the other hand, the CPU 201 determines that the monitoring cancellation request is not received (NO in step S1206), the operation returns to step S1203.

According to the processing illustrated in FIG. 14, when the network camera 200 detects any motion in the region of the sheet output to the monitoring tray of the MFP 100, the network camera 200 can notify the MFP 100 of the fact.

Figure 15:
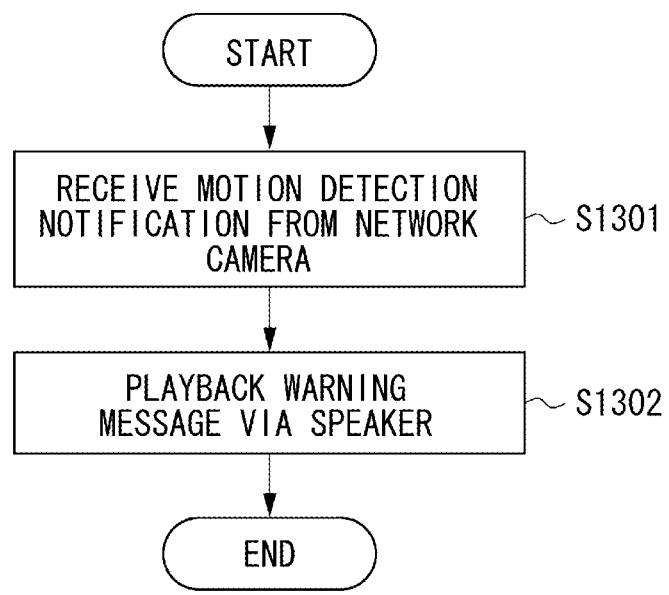
FIG. 15 is a flowchart illustrating an example of warning processing performed by the MFP.

FIG. 15 is a flowchart illustrating an example of warning processing performed by the MFP 100. Each of steps S1301 through S1302 illustrated in FIG. 15 is executed by the MFP 100.

In step S1301, the CPU 101 receives motion detection notification from the network camera 200.

In step S1302, the CPU 101 playbacks a warning message (outputs a warning information) via the speaker 158. Then, the processing illustrated in FIG. 15 ends. The warning message is an example of warning information.

According to the processing illustrated in FIG. 15, the CPU 101 can playback a warming message, for example, "a monitoring job has been output to the first discharge tray. Individual authentication is necessary to receive this print product." This can prevent a person other than the monitoring job owner from erroneously removing the print product from the monitoring tray.

Figure 16:
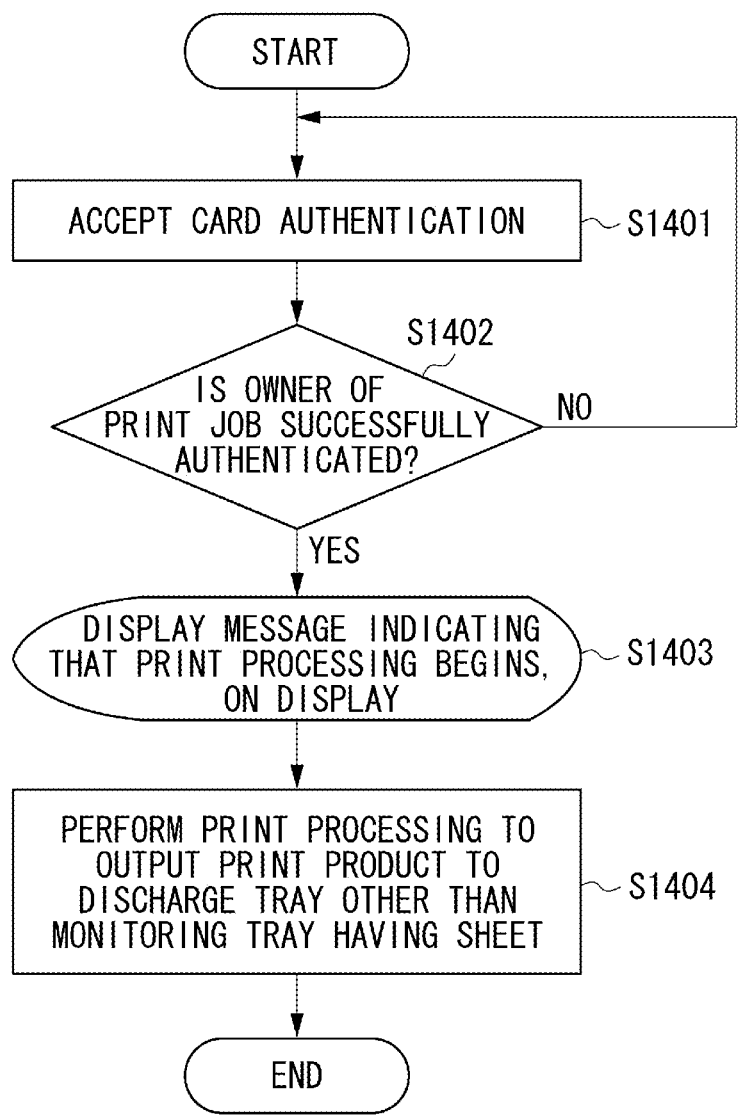
FIG. 16 is a flowchart illustrating an example of secure print output processing performed by the MFP.

FIG. 16 is a flowchart illustrating an example of the secure print output processing performed by the MFP 100. Each of steps S1401 through S1404 illustrated in FIG. 16 is executed by the MFP 100.

In step S1401, the CPU 101 analyses the information read by the card reader 154 to accept card authentication, and determines who has logged in.

In step S1402, the CPU 101 determines whether the owner of the print job is successfully authenticated, based on a result of the card authentication performed in step S1401. If the CPU 101 determines that the owner of the print job is authenticated (YES in step S1402), the operation proceeds to step S1403. On the other hand, if the CPU 101 determines that the person who has logged in is not the owner of the print job (NO in step S1402), the operation returns to step S1401.

In step S1403, the CPU 101 displays a message indicating that print processing begins, on the display touch panel 151 so that the owner of the monitoring job is notified that the MFP 100 begins to print out the monitoring job from now.

In step S1404, the CPU 101 performs control so that the print processing is performed and a print product is output to a discharge tray other than the monitoring tray having the sheet. Then, the processing illustrated in FIG. 16 ends.

According to the processing illustrated in FIG. 16, when the MFP 100 receives a monitoring job and in a case where a document is already output on the monitoring tray of the MFP 100, the CPU 101 can perform hold print processing so as not to print out a job until an owner of the job is successfully authenticated, and to print out the job when the owner of the job is successfully authenticated.

Aspects of the present invention can be achieved by a system or apparatus to which a program for performing one or more functions of the above exemplary embodiments is supplied via a network or a storage media. In such a case, one or more processors in a computer of the system or apparatus read and execute the program. Moreover, aspects of the present invention can be achieved by a circuit (e.g., an application specific integrated circuit (ASIC)) for performing one or more functions.

As described above, according to each of the exemplary embodiments, accidental removal of a print product, including the case of one portion of the print product being pulled out, can be prevented without keeping a user waiting for print output.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-040841 filed Mar. 3, 2014, which is hereby incorporated by reference herein in its entirety.

What is claimed is:
1. An image processing system comprising:
an output unit configured to output, to a monitoring tray, a print product based on a print job to which a monitoring attribute is allocated, and output, to an output tray dif- ferent from the monitoring tray, a print product based on a print job to which a monitoring attribute is not allocated;

an imaging unit configured to capture a video of the monitoring tray;

a detection unit having structure configured to detect motion in a print product region of the monitoring tray, based on the video captured by the imaging unit; and a warning information output unit having structure configured to output warning information according to the detection unit detecting motion in the print product region.

2. The image processing system according to claim 1, wherein, when print processing based on the print job to which the monitoring attribute is allocated is executed, in a case where a portrait sheet having a designated size exists in a sheet feed tray, the output unit feeds the portrait sheet from the sheet feed tray to output a print product to the monitoring tray.

3. The image processing system according to claim 1, wherein the detection unit identifies the print product region according to tray information of the monitoring tray, size information of the print product, and orientation information of the print product to detect motion in the identified print product region.

4. The image processing system according to claim 1, further comprising a determination unit having structure configured to determine whether there is a print product on the monitoring tray, wherein, in a case where the determination unit determines that there is no print product on the monitoring tray, the output unit outputs, to the monitoring tray, the print document based on the print job to which the monitoring attribute is allocated, and wherein, in a case where the determination unit determines that there is a print product on the monitoring tray, the output unit executes hold print processing to output, to an output tray different from the monitoring tray, the print product based on the print job to which the monitoring attribute is allocated.

5. An information processing method for an image processing system, the information processing method comprising:

outputting, to a monitoring tray, a print product based on a print job to which a monitoring attribute is allocated, and output, to an output tray different from the monitoring tray, a print product based on a print job to which a monitoring attribute is not allocated;

capturing a video of the monitoring tray;

detecting motion in a print product region of the monitoring tray, based on the captured video; and outputting warning information according to detecting motion in the print product region.

6. The information processing method according to claim 5, wherein, when print processing based on the print job to which the monitoring attribute is allocated is executed, in a case where a portrait sheet having a designated size exists in a sheet feed tray, outputting includes feeding the portrait sheet from the sheet feed tray to output a print product to the monitoring tray.

7. The information processing method according to claim 5, wherein detecting includes identifying the print product region according to tray information of the monitoring tray, size information of the print product, and orientation information of the print product to detect motion in the identified print product region.

8. The information processing method according to claim 5, further comprising determining whether there is a print product on the monitoring tray, wherein, in a case where it is determined that there is no print product on the monitoring tray, outputting includes outputting, to the monitoring tray, the print document based on the print job to which the monitoring attribute is allocated, and wherein, in a case where it is determined that there is a print product on the monitoring tray, outputting includes executing hold print processing to output, to an output tray different from the monitoring tray, the print product based on the print job to which the monitoring attribute is allocated.

9. A non-transitory computer-readable storage medium storing a program to cause an image processing apparatus to execute an information processing method, the information processing method comprising:

outputting, to a monitoring tray, a print product based on a print job to which a monitoring attribute is allocated, and output, to an output tray different from the monitoring tray, a print product based on a print job to which a monitoring attribute is not allocated;

capturing a video of the monitoring tray;

detecting motion in a print product region of the monitoring tray, based on the captured video; and outputting warning information according to detecting motion in the print product region.

10. The information processing method according to claim 9, wherein, when print processing based on the print job to which the monitoring attribute is allocated is executed, in a case where a portrait sheet having a designated size exists in a sheet feed tray, outputting includes feeding the portrait sheet from the sheet feed tray to output a print product to the monitoring tray.

11. The information processing method according to claim 9, wherein detecting includes identifying the print product region according to tray information of the monitoring tray, size information of the print product, and orientation information of the print product to detect motion in the identified print product region.

12. The information processing method according to claim 9, further comprising determining whether there is a print product on the monitoring tray, wherein, in a case where it is determined that there is no print product on the monitoring tray, outputting includes outputting, to the monitoring tray, the print document based on the print job to which the monitoring attribute is allocated, and wherein, in a case where it is determined that there is a print product on the monitoring tray, outputting includes executing hold print processing to output, to an output tray different from the monitoring tray, the print product based on the print job to which the monitoring attribute is allocated.

13. An image processing apparatus comprising:

an output unit configured to output, to a monitoring tray, a print product based on a print job to which a monitoring attribute is allocated;

a transmitting unit having structure configured to transmit, to a network camera, a monitoring start request including tray information of the monitoring tray, size information of the print product, and orientation information of the print product;

a receiving unit having structure configured to receive, from the network camera, notification indicating that motion in a print product region of the monitoring tray is detected; and a warning information output unit having structure configured to output warning information according to the receiving unit receiving the notification.

14. The image processing apparatus according to claim 13, wherein the output unit outputs, to the monitoring tray, the print product based on the print job to which the monitoring attribute is allocated, and outputs, to an output tray different from the monitoring tray, a print product based on a print job to which a monitoring attribute is not allocated.

15. An information processing method for an image processing apparatus, the information processing method comprising:

outputting, to a monitoring tray, a print product based on a print job to which a monitoring attribute is allocated;

transmitting, to a network camera, a monitoring start request including tray information of the monitoring tray, size information of the print product, and orientation information of the print product;

receiving, from the network camera, notification indicating that motion in a print product region of the monitoring tray is detected; and outputting warning information according to receiving the notification.

16. The information processing method according to claim 15, wherein outputting includes outputting, to the monitoring tray, the print product based on the print job to which the monitoring attribute is allocated, and outputs, to an output tray different from the monitoring tray, a print product based on a print job to which a monitoring attribute is not allocated.

17. A non-transitory computer-readable storage medium storing a program to cause an image processing apparatus to execute an information processing method, the information processing method comprising:

outputting, to a monitoring tray, a print product based on a print job to which a monitoring attribute is allocated;

transmitting, to a network camera, a monitoring start request including tray information of the monitoring tray, size information of the print product, and orientation information of the print product;

receiving, from the network camera, notification indicating that motion in a print product region of the monitoring tray is detected; and outputting warning information according to receiving the notification.

18. The information processing method according to claim 17, wherein outputting includes outputting, to the monitoring tray, the print product based on the print job to which the monitoring attribute is allocated, and outputs, to an output tray different from the monitoring tray, a print product based on a print job to which a monitoring attribute is not allocated.

* * * * *